2 Sheets—Sheet 1.
O. LONG.
Filter.
No. 231,066. Patented Aug. 10, 1880.
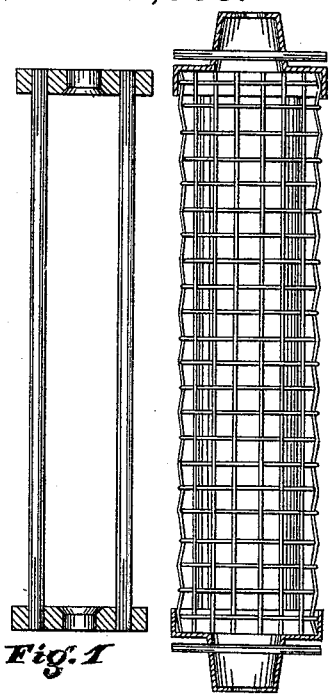
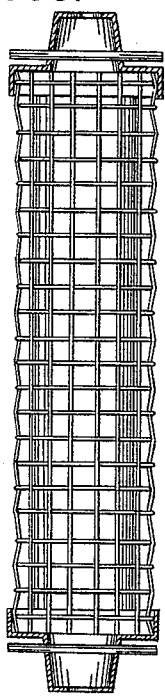
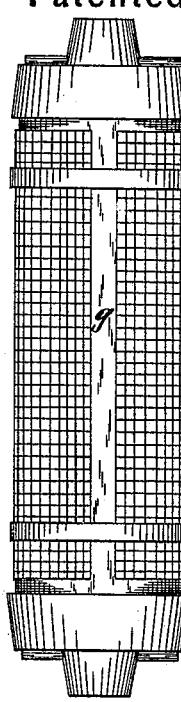
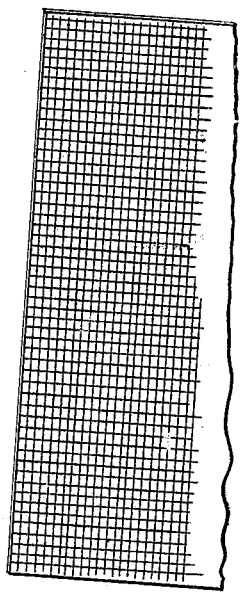
Fig. 1  Fig. 2  Fig. 3  Fig. 4  Fig. 5
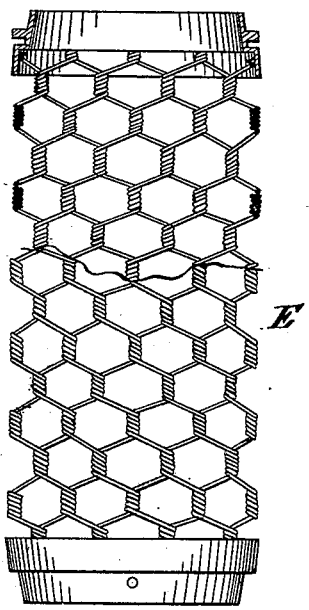
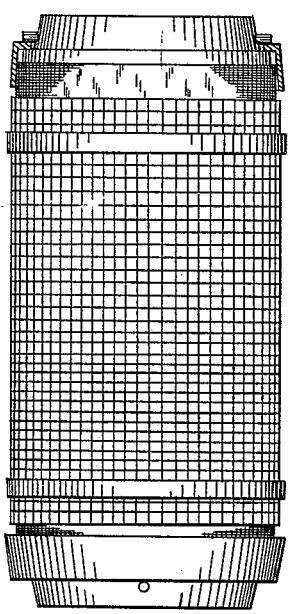
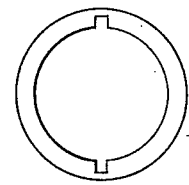
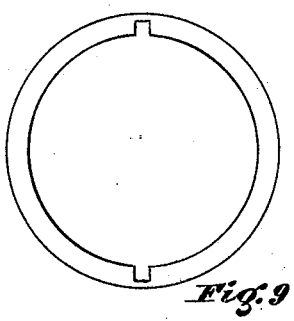
Fig. 6  Fig. 7  Fig. 8  Fig. 9
WITNESSES:
Saml. J. Van Stavoren
W. Connolly
INVENTOR,
Oliver Long,
By Connolly Bro.,
ATTORNEYS.

2 Sheets—Sheet 2.

O. LONG.
Filter.

No. 231,066. Patented Aug. 10, 1880.

WITNESSES:
Saml. J. Van Stavoren
W. Connolly

INVENTOR,
Oliver Long,
By Connolly Bros.,
ATTORNEYS.

UNITED STATES PATENT OFFICE.

OLIVER LONG, OF PHILADELPHIA, PENNSYLVANIA.

FILTER.

SPECIFICATION forming part of Letters Patent No. 231,066, dated August 10, 1880.

Application filed December 9, 1879.

*To all whom it may concern:*

Be it known that I, OLIVER LONG, of Philadelphia, in the county of Philadelphia and State of Pennsylvania, have invented certain new and useful Improvements in Filters; and I do hereby declare the following to be a full, clear, and exact description of the invention, such as will enable others skilled in the art to which it pertains to make and use it, reference being had to the accompanying drawings, which form part of this specification, in which—

Figure 10:
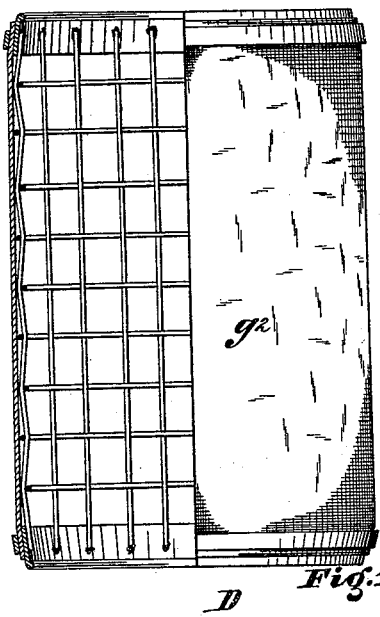
Figure 11:
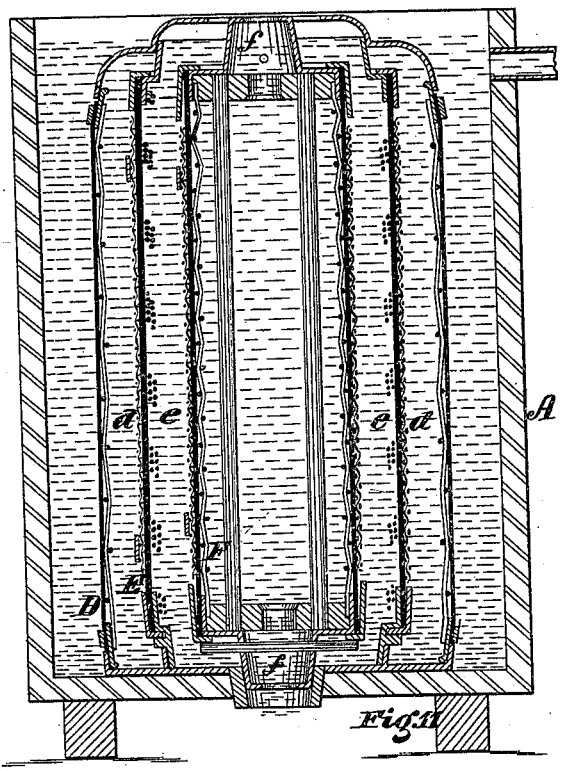
Figure 12:
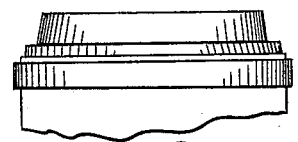
Figure 13:
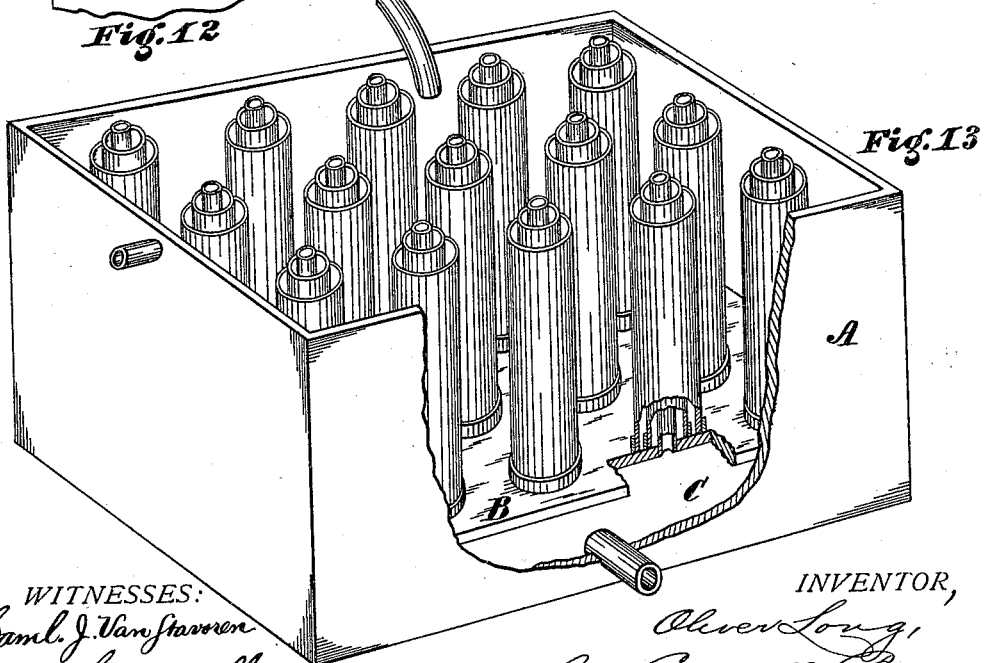

Figures 1 to 5 are sectional elevations, showing the construction of the central cylinder of a nest of filters constructed and arranged according to my invention. Figs. 6, 7 are like views of the middle cylinder; Fig. 10, a like view of the outer cylinder. Figs. 8 and 9 are detail plans. Fig. 12 is a broken detail elevation. Fig. 11 is a vertical longitudinal section of a filter composed of one nest of cylinders, and Fig. 13 is a sectional perspective of the multiple-filter.

My invention has for its object to increase the surface or capacity within any given area of the filtering medium, and also to effect more perfect filtration by subjecting the liquid requiring to be filtered to successive percolations through two or more filtering media, whereby the impurities are removed at serial stages of the process, and not, as heretofore, all at one stage.

My invention accordingly consists in providing a filter consisting of a receiving-vessel in which are placed nests of filtering-cylinders, each nest consisting of two or more cylinders of different diameters placed one within the other. Said cylinders may be either in themselves porous—as porous stone—or rendered porous by wrapping around a suitable frame any appropriate porous filtering material, such as paper, flannel, felt, &c. The cylinders are each secured in water-tight sockets in the bottom of the vessel in which is the liquid to be filtered, and the filtering medium, when wrapping material around frames is employed, is so secured at the top and bottom of each such cylinder that no liquid can find passage to the interior thereof except by passing through the walls. The inmost cylinder is provided with a nozzle at one or both ends, having an orifice sufficient to convey the filtered liquid to a reservoir below, or communicating with the filtering-vessel, and this nozzle is inserted tightly in the base of the tub, tank, or liquid-holder. The larger cylinders envelop the smaller, giving a clear space between them sufficient to afford a full supply of the liquid being filtered to the smaller cylinders within. One nest is, or any number of nests of such cylinders are, placed in a suitable pail, tub, tank, or other vessel, a series of nests being preferable wherever the diameter of the vessel will permit, so as to utilize the whole available cubic space.

For most purposes I prefer to use flannel of close texture for the outer cylinders, and filtering-paper for the innermost cylinder; but the entire series composing a nest may be wrapped with the one kind of material—*i. e.*, paper, flannel, felt, or other substance. The wrapping used may be secured on the cylindrical frames by any suitable means, such as rings, clamps, or flexible or elastic bands; and to protect the paper from abrasion or injury, as well as to retain it in position, a sheet of wire gauze or netting or equivalent material may surround it and be retained by any suitable means.

The advantages of this construction of filter are that each cylinder, being free from contact with its neighbor, the filtration by each is complete in itself, and thus rendering the resistance of the accretions less and less as the liquid passes from one cylinder to another, a great increase in rapidity of outflow is attained over any system where the liquid is required to percolate through several layers of filtering material lying on one another.

The wrappers of each cylinder can be removed, cleansed, or replaced by fresh ones without stoppage of the work of filtration, the change being made on one cylinder at a time. Also, as the tendency of sediment is first to attach itself to the lower end of the cylinders, the two ends of which are alike, they may be reversed or inverted and the speed of outflow maintained for a long period without changing or removing the wrappers.

The construction of the cylinders, when not in themselves porous, consists of rims or heads of spun metal united by bars, wire-netting, or other open or skeleton material. In some cases the cylinders may consist of heads without intermediate rigid frames and tubes or bags of felt or equivalent material.

All the cylinders except the inmost, the nozzle at one end of which is secured in a hole in the bottom of the liquid-holding vessel, are secured in metal sockets fixed to said bottom, so that each cylinder, when so placed, is water-tight at its junction with said vessel; or any equivalent construction may be adopted which will make the ends or heads water-tight, so that liquid to pass into a cylinder must percolate through its wall of filtering material, and can only pass out by the nozzle or opening in the lower end of the inner cylinder.

In the annexed drawings, A indicates the tank for holding the cylinders and the liquid to be filtered. It may have only a single set or nest of cylinders, in which case the nozzle of the inmost cylinder would project through its single bottom; or it may (and for all purposes where extensive filtration is designed should) have several nests of cylinders, the nozzle of the inmost cylinder of each nest passing through the false bottom B, so as to discharge the filtered liquid from all the cylinders into a common chamber, C.

D E F are the filtering-cylinders, located within one another, with clear spaces $d$ $e$ between them, the annular ends of such spaces being closed. Each cylinder, as shown, consists of a skeleton-frame connecting closed or water-tight heads, the inmost cylinders being provided with nozzles $f$, whereby they are secured in position in openings in the bottom or false bottom of the vessel A, and whereby the filtered liquid finds egress. Around the frame of each cylinder is a wrapping of felt, flannel, paper, or equivalent material for filtering purposes, indicated by the letters $g$ $g'$ $g^2$.

What I claim as my invention is—

1. A filter composed of a portable liquid-holder and two or more nests of filtering-cylinders therein, each nest consisting of two or more cylinders of different diameters, placed one within the other, as set forth.

2. The combination of two or more filtering-cylinders placed one within the other with a clear space between, the bottom of such space being closed, so that the liquid filtered through one cylinder will pass from said space through the other cylinders, any one of said cylinders being independently removable for purposes of cleaning, as set forth.

3. A nest of filtering-cylinders consisting of an internal cylinder with escape nozzle or orifice, and one or more surrounding cylinders, a clear space with closed end or bottom being left or provided between the cylinders, any one of said cylinders being independently removable for purposes of cleaning, as set forth.

In testimony that I claim the foregoing I have hereunto set my hand this 5th day of December, 1879.

OLIVER LONG.

Witnesses:
WM. LARZELERE,
S. J. VAN STAVOREN.